United States Patent Office 3,284,519
Patented Nov. 8, 1966

3,284,519
STABILIZATION OF CHLORINATED PARAFFIN WAX
Bryan C. Redmon, Bernardsville, and Henry O. Mottern, Far Hills, N.J., assignors, by mesne assignments, to Cumberland Chemical Corporation, New York, N.Y., a corporation of Delaware
No Drawing. Filed Dec. 23, 1963, Ser. No. 332,967
4 Claims. (Cl. 260—652.5)

This invention relates to a method for the stabilization of normally-solid, highly-chlorinated paraffin waxes and to stabilized compositions comprising such chlorinated paraffin waxes.

Highly chlorinated paraffin waxes, e.g., containing up to about 70% of chemically-combined chlorine, can be prepared by various procedures, but they are most suitably prepared by chlorinating a wax-oil feed mixture comprising a major proportion of a soft paraffin wax and a minor proportion of a hydrocarbon oil. In general, the wax feed mixtures comprise about 85 to 99% by weight of a soft paraffin wax and about 1 to 15% by weight of a normally liquid paraffinic hydrocarbon oil. The paraffin wax preferably has an ASTM melting point of about 105° to 125° F., an API gravity at 150° F. of about 46 to 49, a viscosity at 210° F. of 38 to 40 SSU, and a distillation range by Engler vacuum distillation of 5%—430° F. minimum, 95%—580° F. maximum. The hydrocarbon oil may comprise straight or branched chain aliphatic hydrocarbons or mixtures thereof having a molecular weight within the range of about 280 to 400, a viscosity index of about 95 to 105, a viscosity of about 105 SSU at 100° F., and 40 SSU at 210° F., and an API gravity of about 30 to 34. Preferably, the hydrocarbon oil employed will have an average molecular weight at least equal to the molecular weight of the wax. Both the wax and the hydrocarbon oil may be derived from various paraffinic or mixed base petroleum crudes by conventional refining methods used in the production of refined waxes and lubricating oil base stocks. A minor proportion of a solvent may be advantageously employed in conjunction with the foregoing wax and hydrocarbon oil materials to make up the wax feed mixture. The solvent employed must be of such a nature that its separation from the other chlorination products is not necessary. The solvent will generally comprise a mixture of highly-branched chain saturated hydrocarbons having eleven or more carbon atoms, with a boiling point within the range of about 176° to 260° C., and an average molecular weight of about 160 to 190. The chlorination is suitably carried out by passing gaseous chlorine through the wax mixture at a reaction temperature of about 212° to 230° F. and under superatmospheric pressure, e.g., about 10 to 100 p.s.i.g. in the presence or absence of actinic light or chemical catalysts. Chlorination may be continued until the desired chlorine content has been achieved. A typical procedure for the production of chlorinated paraffin wax is described, for example, in Stretton et al. 2,997,508.

Chlorinated paraffin waxes are useful for various known purposes, e.g., in floor and wall tile compositions, but these waxes show significant instability at elevated temperatures, apparently due to the loss of chlorine which is evolved as hydrogen chloride, and which is evidenced by serious color degradation, i.e., discoloration, of the wax.

Various proposals have heretofore been made for stabilizing highly-chlorinated paraffin waxes, and these suggestions having included the addition of various materials designed to prevent the evolution of hydrogen chloride, whatever the cause may be, from the materials when they are exposed to heat. These prior suggestions, however, have not been entirely satisfactory because the temperature of stability of the chlorinated paraffin wax has not been raised significantly, or excessive quantities of the stabilizers have been required, or for other reasons.

It is, accordingly, an object of the present invention to provide a method of stabilizing highly-chlorinated paraffin waxes which involves the use of a stabilizing agent which is effective even in small quantities to impart significantly improved heat stability to the waxes.

It is another object of the invention to provide a novel stabilized paraffin wax composition composed of highly chlorinated paraffin wax having incorporated with it a stabilizing agent of the character indicated.

In accordance with the invention, these and other objects are realized by the addition to a highly-chlorinated paraffin wax, containing 35 to 70% of chemically combined chlorine, of a small but stabilizing amount of diethyl diazo dicarboxylate, viz., the compound having the formula

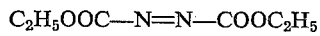
$$C_2H_5OOC-N=N-COOC_2H_5$$

This is a well-known compound and its preparation is described, for example, in U.S. Patent No. 3,017,406.

The addition of this stabilizing agent to the chlorinated paraffin wax can be effected in any convenient manner but most advantageously the stabilizing agent is added to the product chlorinated paraffin wax while the latter is in heated molten form, e.g., following separation from the solvent but before it has cooled, and the agent and wax are thoroughly blended.

Chlorinated paraffin waxes of the type which can be stabilized in accordance with this invention are compounds generally having from 18 to 40 carbon atoms in straight and/or branched chains, and including cyclic groups, and most commonly averaging about 25 carbon atoms. Such chlorinated paraffin waxes have melting points in the general range of 40° to 70° C. As previously mentioned, the chlorinated paraffin waxes contain from about 35 to 70% of chemically combined chlorine. When containing upwards of 50 to 60% of chemically combined chlorine, these chlorinated paraffin waxes are solids under normal conditions. A particularly representative member of this class is chlorinated paraffin wax having from about 68% to about 70% of chlorine.

The stabilizing agent of this invention is especially advantageous in stabilizing chlorinated paraffin waxes against thermally-induced decomposition. In most instances, the singularly improved heat-resistant properties of chlorinated paraffin waxes containing the stabilizer of this invention are most pronounced when the stabilizer is added in a small but effective amount of about 0.5% up to about 5% by weight of the chlorinated paraffin wax. It will be recognized, of course, that in certain applications the amount of stabilizer can be varied outside this range, although a preferred amount is about 1 to 2% by weight. It is a feature of this invention that high stabilizing activity is shown by the stabilizing agent even in these very small concentrations.

The effectiveness of the stabilizing agent of this invention will be readily apparent from the following description of comparative color degradation tests measuring the heat stability of stabilized and unstabilized chlorinated paraffin wax compositions.

EXAMPLE I

A batch of 100 parts by weight of a chlorinated paraffin wax containing about 60% chlorine was heated on a steam bath to 80–90° C. It was removed from the bath as soon as it became fluid enough to stir. Two parts by weight of diethyl diazo dicarboxylate were weighed into the batch and the mixture was thoroughly stirred to distribute the stabilizer.

The apparatus for measuring color degradation of the chlorinated paraffin wax consisted of an 800 w. hot air convection oven and an ASTM colorimeter. The oven was maintained at 150° C. by means of a temperature controller.

A 10 g. sample of the composition just described and a 10 g. sample of the unstabilized chlorinated paraffin wax were placed in 1 oz. vials and the vials were placed in the oven. The forced air draft oven was brought to 150° C. before inserting the vials, and the oven temperature was controlled by a thermocouple. A mercury thermometer was placed in one of the vials. Both the temperature of the oven and of the chlorinated wax were taken at the sampling time. The vials were left open, thereby avoiding possible pressure from generated HCl and simulating conditions of storage and usage of the chlorinated wax. The samples were removed at the end of two hours. An aliquot (2±0.02 g.) of each sample was taken and weighed into a 2½ oz. vial and dissolved in 25 ml. of methyl ethyl ketone by shaking the vial. This solution was then poured into a glass tube provided with the colorimeter and the color determined.

The stabilized sample was very light in color and only slightly darker than it was before it was heated, whereas the unstabilized sample was black.

EXAMPLE II

The tests described in Example I were repeated, using as the stabilized sample the same chlorinated paraffin wax to which was added only 1% by weight of diethyl diazo dicarboxylate. Substantially the same results were obtained, demonstrating the effectiveness of this stabilizer even in very low concentrations.

From the foregoing description of the invention, it will be appreciated that unique stabilizing properties are imparted to chlorinated paraffin wax by diethyl diazo dicarboxylate.

It will also be understood that the practice of this invention is not limited to any one particular method of incorporating the stabilizer. Chlorinated paraffin wax compositions to be stabilized in accordance with this invention may be in the form of solutions, or other liquid form, or as finely-divided solids, the advantageous stabilizing effect being obtained upon addition of the specified stabilizer in each case.

It will be appreciated that the increased temperature stability imparted by the stabilizer of this invention renders its use advantageous in a variety of chlorinated paraffin compositions. Accordingly, such chlorinated paraffin compositions may contain, in addition to the stabilizer of this invention, other ingredients, such as fillers, pigments, extenders, or other like additives.

It will also be understood that, although the invention has been described with specific reference to specific embodiments thereof, many changes and modifications may be made without departing from the scope of the invention as defined in the appended claims. It is intended, therefore, that all matter contained in the foregoing description shall be interpreted as illustrative only and not as limitative of the invention.

We claim:

1. A stabilized normally-solid, highly-chlorinated paraffin wax which comprises a major amount of a normally-solid, highly-chlorinated paraffin wax and a minor amount, sufficient to stabilize said wax, of diethyl diazo dicarboxylate.

2. A stabilized normally-solid, highly-chlorinated paraffin wax which comprises a normally-solid, highly-chlorinated paraffin wax and about 0.5 to 5% of diethyl diazo dicarboxylate.

3. A stabilized normally-solid, highly-chlorinated paraffin wax which comprises a major amount of a normally-solid, chlorinated paraffin wax containing about 35 to 70% of chemically-combined chlorine, and a minor amount, sufficient to stabilize said wax, of diethyl diazo dicarboxylate.

4. A stabilized normally-solid, highly-chlorinated paraffin wax which comprises a normally-solid chlorinated paraffin wax containing about 35 to 70% of chemically-combined chlorine and about 0.5 to 5% of diethyl diazo dicarboxylate.

References Cited by the Examiner

UNITED STATES PATENTS 2,077,429   4/1937   McMahon _____ 260—652.5

FOREIGN PATENTS 1,111,374   2/1962   Germany.

LEON ZITVER, *Primary Examiner.*

M. JACOB, *Assistant Examiner.*